United States Patent
El Abed et al.

(10) Patent No.: US 10,509,904 B2
(45) Date of Patent: Dec. 17, 2019

(54) USB ATTACK PROTECTION

(71) Applicant: Alcatel Lucent, Boulogne Billancourt (FR)

(72) Inventors: Haithem El Abed, Nozay (FR); Serge Papillon, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 100 days.

(21) Appl. No.: 15/573,890

(22) PCT Filed: Apr. 22, 2016

(86) PCT No.: PCT/EP2016/059067
§ 371 (c)(1),
(2) Date: Nov. 14, 2017

(87) PCT Pub. No.: WO2016/198201
PCT Pub. Date: Dec. 15, 2016

(65) Prior Publication Data
US 2018/0293376 A1    Oct. 11, 2018

(30) Foreign Application Priority Data

Jun. 10, 2015   (EP) .................................... 15305882

(51) Int. Cl.
*G06F 21/55*   (2013.01)
*G06F 21/73*   (2013.01)
*G06F 21/85*   (2013.01)

(52) U.S. Cl.
CPC ............ *G06F 21/552* (2013.01); *G06F 21/73* (2013.01); *G06F 21/85* (2013.01); *G06F 2213/0042* (2013.01); *G06F 2221/034* (2013.01)

(58) Field of Classification Search
CPC ....... G06F 2213/0042; G06F 2221/034; G06F 21/06
See application file for complete search history.

(56) References Cited

U.S. PATENT DOCUMENTS 8,230,149 B1    7/2012  Long et al.
9,990,325 B2 *  6/2018  Hetzler ............... G06F 13/4068
(Continued)

OTHER PUBLICATIONS

Verma, Saurabh, and Abhishek Singh. "Data theft prevention & endpoint protection from unauthorized USB devices—Implementation." 2012 Fourth International Conference on Advanced Computing (ICoAC). IEEE, 2012. (Year: 2012).*
(Continued)

*Primary Examiner* — Madhuri R Herzog
(74) *Attorney, Agent, or Firm* — McCracken & Gillen LLC

(57) ABSTRACT

A system and method for protecting a universal serial bus device from being used in an attack during communication between a communication device and an accessory device is disclosed. A protection device inserted between them through a USB link performs steps of receiving a message from the accessory device, including fields of characteristics of the accessory device; generating a random identifier; sending it to the communication device that creates a registration rule based on the generated random identifier; modifying an intercepted response from the accessory device to a request from the communication device, the request being dedicated to get a value associated with a serial number of the accessory device, by including the generated random identifier; and sending the modified response to the communication device, the modified response triggering a query for registration of the accessory device by means of the modified response and the created registration rule.

15 Claims, 2 Drawing Sheets

(56) References Cited

U.S. PATENT DOCUMENTS

| | | | | |
|---|---|---|---|---|
| 2011/0088093 | A1* | 4/2011 | Kang | G06F 21/567 |
| | | | | 726/22 |
| 2012/0311207 | A1* | 12/2012 | Powers | G06F 13/42 |
| | | | | 710/106 |
| 2013/0014221 | A1* | 1/2013 | Moore | G06F 21/85 |
| | | | | 726/3 |
| 2013/0167254 | A1 | 6/2013 | Gyllenskog | |
| 2013/0283371 | A1* | 10/2013 | Sitbon | G06F 21/44 |
| | | | | 726/17 |
| 2016/0196454 | A1* | 7/2016 | Soffer | H01R 4/4809 |
| | | | | 726/16 |

OTHER PUBLICATIONS

Pham, Dung Vu, Ali Syed, and Malka N. Halgamuge. "Universal serial bus based software attacks and protection solutions." digital investigation 7.3-4 (2011): 172-184. (Year: 2011).*

Nohl, K. et al; SRLabs Template v12 BadUSB—On accessories that turn evil; Aug. 7, 2014; XP055144279; Retrieved from the internet: URL:https://srlabs.de/blog/wp-content/uploads/2014/07/SRLabs-BadUSB-BlackHat-v1.pdf; [retrieved on Oct. 3, 2014; p. 20.

* cited by examiner

USB ATTACK PROTECTION

FIELD OF THE INVENTION

The present invention pertains to communication devices and, more particularly, to communication devices, such as media players, that receive accessory devices, such as USB devices.

BACKGROUND

Modern communication devices, such as computers, allow computer memory expansion by providing a universal serial bus (USB) receptacle. USB peripheral devices usually have a plug with physical and electronic specifications, just as communication devices capable of receiving a USB plug have a receptacle with physical and electronic specifications.

USB devices can be of different natures, like a storage device (flash drive), a computer mouse, a computer keyboard, a printer, or a webcam.

Specifically, USB storage devices are small, inexpensive, and highly portable, and are ubiquitous in modern computing devices. Due to its portable nature, a single USB storage device is often being plugged into a number of different hosting communication devices. For example, a consumer can store his or her personal music collection on a USB storage device and then play that music on a computer, a smart phone, or even an automobile stereo system.

The highly portability characteristic of USB storage devices make them a popular target as of computer viruses.

Recently, serious attack dubbed BadUSB has been unveiled. It involves malicious USB devices attacking a victim host in an instance and a malicious host reprogramming a victim USB device in another instance. The combination of both attacks paves the way to a physical propagation of computer malware, one that is able to reach air-gapped systems (systems that are isolated from any outside networks). In this kind of attack, a custom built USB device can act maliciously through keyboard emulation in order to attack a USB host. A normal USB device (USB storage stick for example) can be reprogrammed at the micro-controller level by a malicious host, thus creating a malicious USB device capable of attacking other USB hosts that it gets inserted into. This is done at the controller level (firmware) of the USB device and not at the file system level that can be formatted or scanned by an anti-virus.

Thus, there is a need for improved techniques that enable communication devices to control the nature of USB device connected to the communication devices, in order to protect both the USB devices and the host communication devices simultaneously.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for a universal serial bus, USB, attack protection between a communication device and an accessory device, the method comprising the following steps in a protection device inserted between the communication device and the accessory device (AD) through a USB link:

receiving a message from the accessory device, the message including fields of characteristics of the accessory device, generating a random identifier, sending the generated random identifier to a security agent of the communication device that creates a registration rule based on the generated random identifier, intercepting a response from the accessory device to a request from the communication device, the request being dedicated to get a value associated with a serial number of the accessory device, modifying said response by including the generated random identifier, yielding to a modified response, sending the modified response to a software module managing USB drivers of the communication device, the modified response triggering a query for registration of the accessory device by means of the content of the modified response and the created registration rule.

Advantageously, the invention offers an enterprise grade solution to mitigate the recent BadUSB attacks. A trust is achieved by enforcing the use of the usb accessory device with a usb shield provided by the protection device. To this end the protection device sanitizes the link between the accessory device and the communication device at the hardware level, thus preventing attacks in both directions.

The protection device offers a guarantee that without its presence, no USB accessory device can operate with the communication device.

The solution also improves personalization capabilities of portable USB storage devices, making them friendlier to use and share.

In an embodiment, protection device is dedicated to one or several type of accessory devices, allowing only said one or several type of accessory devices to communicate with the communication device.

In an embodiment, the message contains a USB Device Descriptor.

In an embodiment, the communication device is initially configured to forbid registration of any USB device, once the protection device is plugged into the communication device, and the created registration rule based on the generated random identifier is an exception rule allowing registration of a USB accessory device corresponding to said generated random identifier.

In an embodiment, during the forwarding of messages between the accessory device and the communication device, the protection device produces a notification if a message breaches a security rule.

In an embodiment, at least one security rule commands the stopping of exchange of any message from the accessory device if a field associated with a type of device in the received message is not included in a list of authorized devices.

In an embodiment, the notification is sent to a monitoring server via the communication device.

In an embodiment, the protection device initializes a set of security rules with a shield policy retrieved from a server via the communication device.

In an embodiment, the protection device and the communication device initially execute a handshake based on certificates or pre shared key, allowing them to mutually authenticate each other.

In an embodiment, when the accessory device is taken off from the protection device, the created policy rule is deleted.

In an embodiment, said request dedicated to get a value associated with a serial number of the accessory device is a request for string descriptor.

In an embodiment, whereby the generated random identifier replaces or is appended to said value associated with a serial number of the accessory device.

Another advantage of the solution is that beyond mitigating the above threats, it integrates seamlessly in an enterprise IT infrastructure, and contributes to the global safety of an Entreprise Information System, by stopping the attack and allow a monitoring system to take the attempt into account for eventually further correlation with other events.

The invention relates also to a protection device for a universal serial bus, USB, attack protection between a communication device and an accessory device, the protection device being inserted between the communication device and the accessory device through a USB link and comprising:

means for receiving a message from the accessory device, the message including fields of characteristics of the accessory device, means for generating a random identifier, means for sending the generated random identifier to a security agent of the communication device that creates a policy rule based on the generated random identifier, means for intercepting a response from the accessory device to a request from the communication device, the request being dedicated to get a value associated with a serial number of the accessory device, means for modifying said response by including the generated random identifier, yielding to a modified response, means for sending the modified response to a software module managing USB drivers of the communication device, the modified response triggering a query for registration of the accessory device by means of the content of the modified message and the created registration rule.

The invention also pertains to a computer program capable of being implemented within a device, said program comprising instructions which, when the program is executed within said device, carry out steps according to the inventive method.

BRIEF DESCRIPTION OF THE DRAWINGS

The present invention and the benefits thereof shall be better understood upon examining the description below, which makes reference to the attached figures, in which.

DETAILED DESCRIPTION OF THE INVENTION

Figure 1:
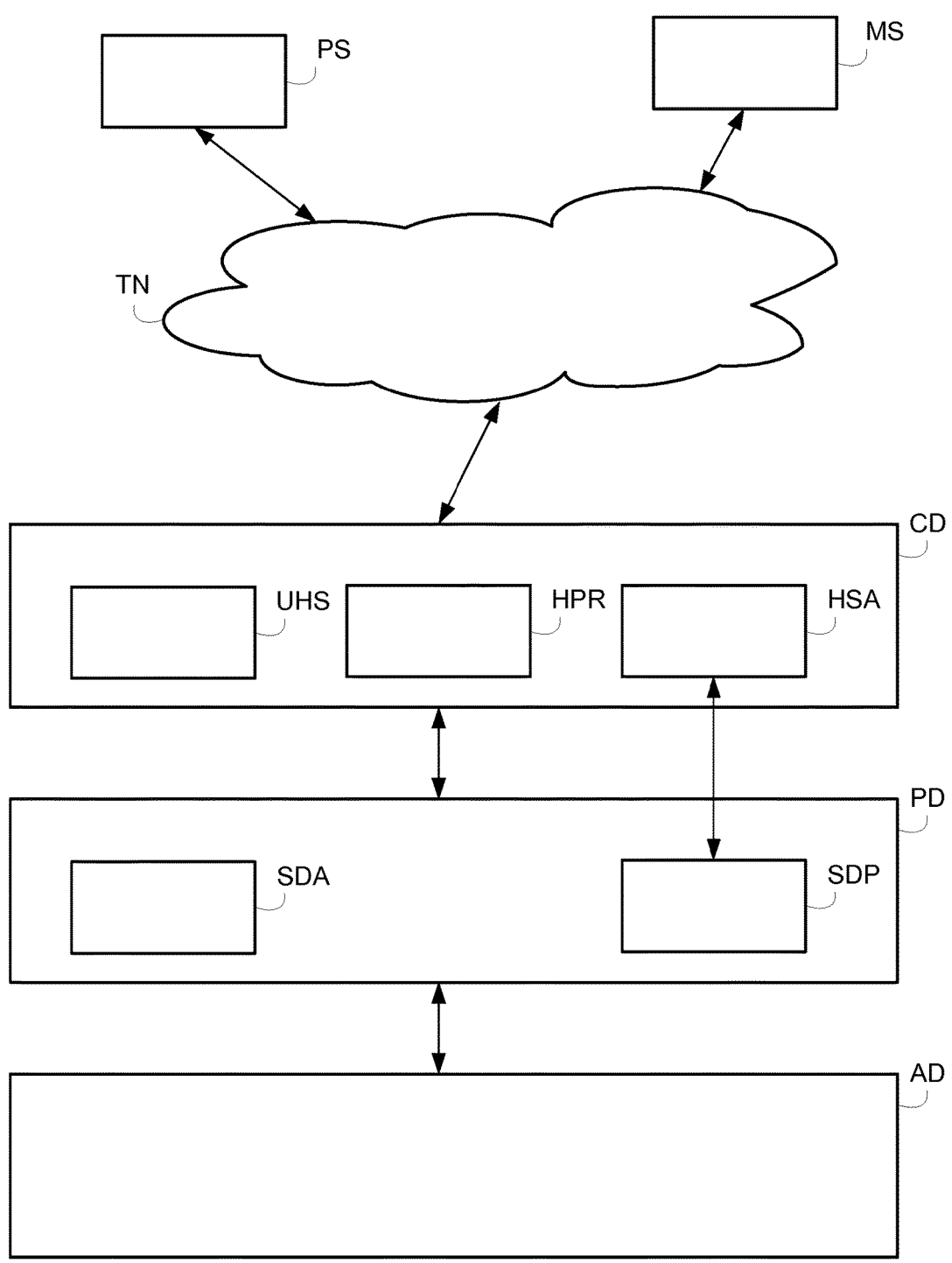
FIG. 1 is a schematic block diagram of a communication system according to one embodiment of the invention for a USB attack protection.

With reference to FIG. 1, a communication system according to the invention comprises a communication device CD, a protection device PD and an accessory device AD, and a protection server PS and a monitoring server MS accessible by the communication device CD through a telecommunication network TN.

The telecommunication network TN may be a wired or wireless network, or a combination of wired and wireless networks.

The telecommunication network TN can be a packet network, for example, an IP ("Internet Protocol") high-speed network such as the Internet or an intranet, or even a company-specific private network.

The communication device CD is capable of connecting directly with the accessory device AD via an USB link in order to access to the content stored in the accessory device. The communication device can be referred to as a host device receiving via a plug the accessory device AD.

The communication device CD can be a personal computer or a laptop, a tablet, a smart phone, a personal digital assistant, a set-top box, a residential gateway, a game console or a connected television, for instance. More generally it concerns any type of electronic equipment comprising a communication module, capable of establishing connection with the accessory device AD via a USB link to exchange data such as messages with the accessory device.

The communication device CD has one or more USB receptacles wherein various USB accessory devices can be physically plugged.

The accessory device AD is a USB device including a USB plug physically and mechanically compatible with the USB receptacle of the communication device wherein the USB plug can be plugged into the USB receptacle to achieve physical and electrical connectivity.

In one example, the accessory device AD is a thumb drive or a hard drive as storage device.

In another example, the accessory device AD is a personal computer, a laptop, a tablet or a smart phone.

In another example, the accessory device AD is a connected object such as an advertisement board, a television set, a household appliance, a communication terminal, a fridge, a camera. A connected object comprises a communication interface that is part of a data processing unit that may be directly embedded in the connected object.

The accessory device AD contains a process typically a firmware running on a microcontroller implementing the USB protocol and higher functions of the accessory device AD.

The protection device PD also includes a USB plug physically and mechanically compatible with the USB receptacle of the communication device CD, and a USB receptacle physically and mechanically compatible with the USB plug of the accessory device AD. Thus the protection device PD can be physically and electrically connected with the communication device CD and the accessory device AD. The protection device PD allows the communication device CD and the accessory device AD to be electrically connected therethrough.

The communication device CD comprises a USB host stack UHS, a host policy registry HPR and a host shield agent HSA.

The USB host stack UHS is a software module managing USB device drivers in an operating system. The USB host stack UHS implements the USB protocol, installs and loads appropriate drivers for different USB devices.

The policy registry HPR is a database for registration rules, with an API (Application Programming Interface) for query, insertion and deletion. Registration rules can be enforced by a policy enforcer, that is for example a Local Group Policy (LGP) for a Windows® system or a udev subsystem for a Linux® system.

The host shield agent HSA acts as a security agent and is a process agent responsible for mutual authentication with the protection device PD. The host shield agent HSA is also responsible for fetching a shield policy from the protection server PS and relaying notifications of attack attempts to the monitoring server MS. The host shield agent HSA stores a certificate (or a pre shared key) signed by an enterprise authority and is also configured with the network addresses of the protection server PS and the monitoring server MS.

Per default, the host shield agent HSA is configured to forbid registration of any USB device unless there is an explicit policy allowing it.

The protection server PS is a server managing a set of hosts in an enterprise setting. For example, the protection server PS implements an Active Directory (AD) domain controller in a Windows® environment. The protection server PS is configured with a shield policy to be used in the enterprise.

The monitoring server MS is a central server monitoring and managing security events in an enterprise setting.

The protection device PD comprises a shield device agent SDA and a shield device proxy SDP.

The shield device agent SDA is a process agent responsible for mutual authentication with the communication device CD. The shield device agent SDA is also responsible for the loading of a shield policy, the creation of the secure identifier, and the notification of attack attempts. The shield device agent SDA is loaded with a certificate signed by an enterprise authority (alternatively an enterprise pre shared key could be used instead of the certificate), as well as the public key associated with the certificate.

The shield device proxy SDP plays the role of surrogate of the accessory device AD, and is responsible for filtering messages between the communication device and the accessory device (AD). The shield device proxy SDP implements a database that contains security rules, containing for example a match (of a message) and an action (drop, patch etc).

The shield device proxy SDP is able to analyze and modify the content of a Device Descriptor. A Device Descriptor contains the following fields respectively associated with the following descriptions:

Field: bLength
  Description: Specifies the length, in bytes, of this descriptor.
Field: bDescriptorType
  Description: Specifies the descriptor type.
Field: bcdUSB
  Description: Identifies the version of the USB specification that this descriptor structure complies with. This value is a binary-coded decimal number.
Field: bDeviceClass
  Description: Specifies the class code of the device as assigned by the USB specification group.
Field: bDeviceSubClass
  Description: Specifies the subclass code of the device as assigned by the USB specification group.
Field: bDeviceProtocol
  Description: Specifies the protocol code of the device as assigned by the USB specification group.
Field: bMaxPacketSize0
  Description: Specifies the maximum packet size, in bytes, for endpoint zero of the device. The value must be set to 8, 16, 32, or 64.
Field: idVendor
  Description: Specifies the vendor identifier for the device as assigned by the USB specification committee.
Field: idProduct
  Description: Specifies the product identifier. This value is assigned by the manufacturer and is device-specific.
Field: bcdDevice
  Description: Identifies the version of the device. This value is a binary-coded decimal number.
Field: iManufacturer
  Description: Specifies a device-defined index of the string descriptor that provides a string containing the name of the manufacturer of this device.
Field: iProduct
  Description: Specifies a device-defined index of the string descriptor that provides a string that contains a description of the device.
Field: iSerialNumber
  Description: Specifies a device-defined index of the string descriptor that provides a string that contains a manufacturer-determined serial number for the device.
Field: bNumConfigurations
  Description: Specifies the total number of possible configurations for the device.

The shield device proxy SDP is dedicated to filter one or several type of USB accessory devices. For example, the shield device proxy SDP is dedicated to operate with USB storage devices and will not allow any other type of USB accessory device to communicate with the communication device CD. To that end for example, the shield device proxy SDP consults security rules in the database with a Device Descriptor retrieved from the USB accessory device. More especially, the shield device proxy SDP checks if the value of the field "bDeviceClass", assumed to be associated with the type of device, is included in a list of authorized devices.

Figure 2:
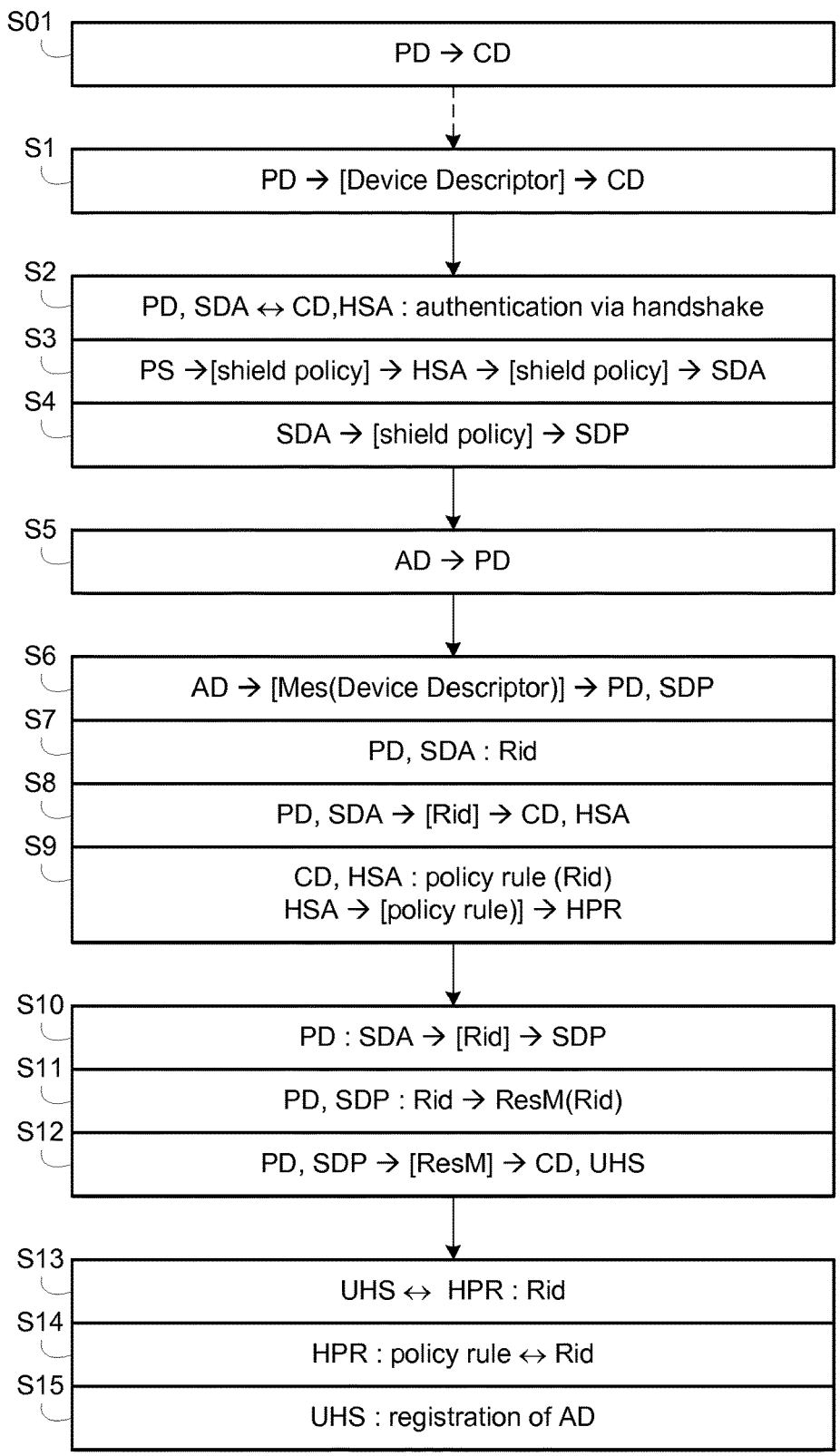
FIG. 2 is an algorithm of a method for a USB attack protection according to one embodiment of the invention.

With reference to FIG. 2, a method for a USB attack protection according to one embodiment of the invention comprises steps S1 to S15 executed within the communication system.

In an initial step S01, a user wants to use the accessory device AD with the communication device CD and starts by inserting the protection device PD into the communication device CD.

In step S1, the protection device PD registers with the communication device CD. Upon control request from the communication device, the shield device agent SDA sends a message to the USB host stack UHS, the message containing a Device Descriptor that includes information about the protection device PD, its configurations, interfaces and the related endpoints.

The USB host stack UHS loads a driver portion of the host protection agent HPA.

The registration establishes a bidirectional communication link between the protection device PD and the communication device CD.

In step S2, the shield device agent SDA and the host shield agent HSA execute a handshake based on the stored certificates or the stored pre shared key, allowing them to mutually authenticate each other.

In step S3, the host shield agent HSA fetches the shield policy from the protection server PS and sends the retrieved shield policy to shield device agent SDA.

In step S4, the shield device agent SDA initializes the shield device proxy SDP with the received shield policy. The shield policy is stored in the database of the shield device proxy SDP.

In steps S2 to S4, the protection device PD is initialized with a shield policy.

In step S5, the accessory device AD is plugged into the protection device PD. Thus the protection device PD is inserted between the accessory device AD and the communication device CD.

In step S6, the accessory device AD sends a message Mes to the protection device PD, the message including information about the accessory device. The message contains a Device Descriptor associated with the accessory device. The message Mes in sent in response to an initial request from the communication device to get the Device Descriptor. For example, the initial request is of type "Get Device Descriptor".

More particularly, the shield device proxy SDP receives the Device Descriptor and notifies the shield device agent SDA of the presence of the accessory device as USB device.

In step S7, the shield device agent SDA generates a random identifier Rid. The random identifier is assumed to be long enough to be unique. The random identifier Rid acts as a value associated with a serial number iSerialNumber in the Device Descriptor. The serial number iSerialNumber in the Device Descriptor is associated with an index and said value associated with the serial number iSerialNumber in the Device Descriptor can be obtained via a specific request for this index. This specific request can be of type "Get String Descriptor".

In step S8, the shield device agent SDA sends the generated random identifier Rid to the host shield agent HSA of the communication device.

In step S9, the host shield agent HSA creates a registration rule based on the random identifier Rid and inserts the created registration rule into the database of the policy registry HPR. The host shield agent HSA sends an acknowledgment to the shield device agent SDA, meaning the random identifier Rid was received.

In step S10, the shield device agent SDA sends the generated random identifier Rid to the shield device proxy SDP.

In step S11, the USB host stack UHS sends a set of requests towards the accessory device AD through the protection device PD, to get more information about the accessory device. The requests are dedicated to different descriptors of the accessory device.

When the USB host stack UHS sends a specific request dedicated to get the value associated with a serial number iSerialNumber, the accessory device AD sends a specific response including the value associated with the serial number iSerialNumber towards the USB host stack UHS, and the specific response is intercepted by the shield device proxy SDP.

The shield device proxy SDP modifies in the specific response the value associated with the serial number iSerialNumber by including the generated random identifier Rid. The generated random identifier Rid replaces said value or is appended to said value. The shield device proxy SDP this produces a modified response ResM.

In step S12, the shield device proxy SDP sends the modified response ResM containing the random identifier Rid to the USB host stack UHS of the communication device.

In step S13, when the USB host stack UHS has finished to send the requests towards the accessory device AD through the protection device PD to get more information about the accessory device, the USB host stack UHS queries the policy registry HPR for registration of the accessory device, especially by means of the generated random identifier Rid.

In step S14, the policy registry HPR verifies the modified response ResM including the value associated with the serial number iSerialNumber, i.e. the generated random identifier Rid,is allowed by means of the created registration rule stored in the database, and gives the authorization for registration to the USB host stack.

In step S15, the USB host stack completes the registration of the accessory device AD and loads the appropriate drivers for this latter, by means of the Device Descriptor and of the different responses to the set of requests.

According to the invention, the communication device was initially configured to forbid communication with any USB accessory device. Finally, at the end of step S9, a new registration rule based on the random identifier Rid was created as an exception rule to allow registration of a USB accessory device that presents a Device Descriptor containing the random identifier Rid.

Then, the shield device proxy SDP can continue to forward messages between the accessory device AD and the communication device CD by consulting the database that contains security rules.

If during the forwarding of messages between the accessory device AD and the communication device CD, the shield device proxy SDP encounters a security rule in the database, i.e. a message breaches a security rule, the shield device proxy SDP produces a notification. The notification is then sent to the host shield agent HSA via the shield device agent SDA, and then forwarded to the monitoring server MS. For example, if a malicious accessory device initially declared as a USB storage device resets and then declares as a keyboard, the shield device proxy SDP, that is dedicated to USB storage devices, encounters a security rule that instructs to reject the accessory device.

Furthermore, the shield device proxy SDP consults also the database that contains security rules during other steps of the method, for example in step S6; S10, S11 and S12, to produces a notification to be sent to the host shield agent HSA via the shield device agent SDA, and then forwarded to the monitoring server MS. For example, if a malicious accessory device has the physically appearance of a USB storage device but declares itself as a keyboard, the shield device proxy SDP, that is dedicated to USB storage devices, encounters a security rule that instructs to reject the accessory device, during S6.

When the accessory device is plugged off from the protection device, the created registration rule stored in the database of the policy registry HPR is deleted.

Furthermore, if the protection device PD is plugged off from the communication device, the host shield agent HAS is deactivated.

The invention described here relates to a method and a device for a USB attack protection. According to one implementation of the invention, the steps of the invention are determined by the instructions of a computer program incorporated into the device, such as the protection device PD. The program comprises program instructions which, when said program is loaded and executed within the device, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:
1. A method for protecting a communication device from a universal serial bus (USB) attack of an accessory device, the method comprising:
   generating a random identifier by a protection device connected to both the communication device initially configured to forbid registration of any USB device and to the accessory device through separate USB links;
   sending, by the protection device, the generated random identifier to a security agent of the communication device that creates a registration rule based on the generated random identifier;

intercepting, by the protection device, a response from the accessory device to a request from the communication device, the request being dedicated to get a value associated with a serial number of the accessory device;

modifying, by the protection device, the response to include the generated random identifier in the response to yield a modified response; and sending, by the protection device, the modified response to a software module managing USB drivers in the communication device, the modified response triggering a query for registration of the accessory device by means of a content of the modified response and the created registration rule;

wherein once the protection device is plugged into the communication device, the created registration rule based on the generated random identifier is an exception rule allowing registration of a USB accessory device corresponding to the generated random identifier.

2. The method according to claim 1, wherein the protection device is dedicated to one or several type of accessory devices, allowing only the one or several type of accessory devices to communicate with the communication device.

3. The method according to claim 1, further comprising receiving, by the protection device, a message from the accessory device, wherein the message contains a Device Descriptor that includes fields of characteristics of the accessory device.

4. The method according to claim 1, further comprising producing, by the protection device, a notification if a message breaches a security rule during the forwarding of messages between the accessory device and the communication device.

5. The method according to claim 4, wherein at least one security rule commands the stopping of an exchange of any message from the accessory device if a field associated with a type of device in the received message is not included in a list of authorized devices.

6. The method according to claim 4, wherein the notification is sent to a monitoring server via the communication device.

7. The method according to claim 4, further comprising initializing, by the protection device, a set of security rules with a shield policy retrieved from a server via the communication device.

8. The method according to claim 1, wherein the protection device and the communication device initially execute a handshake based on certificates or pre-shared key, allowing them to mutually authenticate each other.

9. The method according to claim 1, wherein when the accessory device is taken off from the protection device, the created registration rule is deleted.

10. The method according to claim 1, wherein the request dedicated to get a value associated with the serial number of the accessory device is a request for a string descriptor.

11. The method according to claim 1, wherein the generated random identifier replaces or is appended to the value associated with the serial number of the accessory device.

12. A device for protecting a communication device from a universal serial bus (USB) attack of an accessory device, comprising:

means for generating a random identifier, the means for generating being connected to both the communication device initially configured to forbid registration of any USB device and to the accessory device through separate USB links;

means for sending the generated random identifier to a security agent of the communication device that creates a registration rule based on the generated random identifier;

means for intercepting a response from the accessory device to a request from the communication device, the request being dedicated to get a value associated with a serial number of the accessory device;

means for modifying the response to include the generated random identifier in the response to yield a modified response; and means for sending the modified response to a software module managing USB drivers in the communication device, the modified response triggering a query for registration of the accessory device by means of a content of the modified response and the created registration rule;

wherein once the device is plugged into the communication device, the created registration rule based on the generated random identifier is an exception rule allowing registration of a USB accessory device corresponding to the generated random identifier.

13. A non-transitory computer-readable medium storing computer-readable instructions capable of being executed within a device to protect a communication device from a universal serial bus (USB) attack of an accessory device, the computer-readable instructions performing steps comprising:

generating a random identifier by a protection device connected to both the communication device initially configured to forbid registration of any USB device and to the accessory device through separate USB links;

sending, by the protection device, the generated random identifier to a security agent of the communication device that creates a registration rule based on the generated random identifier;

intercepting, by the protection device, a response from the accessory device to a request from the communication device, the request being dedicated to get a value associated with a serial number of the accessory device;

modifying, by the protection device, the response to include the generated random identifier in the response to yield a modified response; and sending, by the protection device, the modified response to a software module managing USB drivers in the communication device, the modified response triggering a query for registration of the accessory device by means of a content of the modified response and the created registration rule;

wherein once the protection device is plugged into the communication device, the created registration rule based on the generated random identifier is an exception rule allowing registration of a USB accessory device corresponding to the generated random identifier.

14. The method according to claim 3, further comprising checking, by the protection device, security rules in a database with a value associated with a type of device in the Device Descriptor to determine whether the accessory device is included in a list of authorized devices.

15. A system, comprising:
- a communication device initially configured to forbid registration of any universal serial bus (USB) device;
- a USB accessory device; and
- a protection device connected to both the communication device and to the USB accessory device through separate USB links;
- wherein the protection device is configured to:
  - generate a random identifier;
  - send the generated random identifier to a security agent of the communication device that creates a registration rule based on the generated random identifier;
  - intercept a response from the USB accessory device to a request from the communication device, the request being dedicated to get a value associated with a serial number of the accessory device;
  - modify the response to include the generated random identifier in the response to yield a modified response; and
  - send the modified response to a software module managing USB drivers in the communication device, the modified response triggering a query for registration of the USB accessory device by means of a content of the modified response and the created registration rule;
- wherein once the protection device is plugged into the communication device, the created registration rule based on the generated random identifier is an exception rule allowing registration of the USB accessory device corresponding to the generated random identifier.

* * * * *